(12) United States Patent
Agarwal et al.

(10) Patent No.: US 11,961,524 B2
(45) Date of Patent: Apr. 16, 2024

(54) SYSTEM AND METHOD FOR EXTRACTING AND DISPLAYING SPEAKER INFORMATION IN AN ATC TRANSCRIPTION

(71) Applicant: HONEYWELL INTERNATIONAL INC., Charlotte, NC (US)

(72) Inventors: Jitender Kumar Agarwal, Bangalore (IN); Mohan M. Thippeswamy, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 338 days.

(21) Appl. No.: 17/305,913

(22) Filed: Jul. 16, 2021

(65) Prior Publication Data

US 2022/0383879 A1 Dec. 1, 2022

(30) Foreign Application Priority Data

May 27, 2021 (IN) .............................. 202111023583

(51) Int. Cl.
| | |
|---|---|
| G10L 17/04 | (2013.01) |
| G06F 3/14 | (2006.01) |
| G10L 15/04 | (2013.01) |
| G10L 15/06 | (2013.01) |
| G10L 15/22 | (2006.01) |
| G10L 15/26 | (2006.01) |

(52) U.S. Cl.
CPC ................ *G10L 17/04* (2013.01); *G06F 3/14* (2013.01); *G10L 15/04* (2013.01); *G10L 15/06* (2013.01); *G10L 15/22* (2013.01); *G10L 15/26* (2013.01); *G10L 2015/221* (2013.01)

(58) Field of Classification Search
CPC .................................. G06F 3/14; G06F 40/20
See application file for complete search history.

(56) References Cited

U.S. PATENT DOCUMENTS

| | | |
|---|---|---|
| 6,332,122 B1 | 12/2001 | Ortega et al. |
| 6,424,946 B1 | 7/2002 | Tritschler et al. |
| 6,775,651 B1 | 8/2004 | Lewis et al. |

(Continued)

FOREIGN PATENT DOCUMENTS

| | | |
|---|---|---|
| CN | 110134756 A | 8/2019 |
| FR | 3032575 A1 | 8/2016 |

*Primary Examiner* — Jesse S Pullias
(74) *Attorney, Agent, or Firm* — Lorenz & Kopf LLC

(57) ABSTRACT

A system for extracting speaker information in an ATC transcription and displaying the speaker information on a graphical display unit is provided. The system is configured to: segment a stream of audio received from an ATC and other aircraft into a plurality of chunks; determine, for each chunk, if the speaker is enrolled in an enrolled speaker database; when the speaker is enrolled in the enrolled speaker database, decode the chunk using a speaker-dependent automatic speech recognition (ASR) model and tag the chunk with a permanent name for the speaker; when the speaker is not enrolled in the enrolled speaker database, assign a temporary name for the speaker, tag the chunk with the temporary name, and decode the chunk using a speaker independent speech recognition model; format the decoded chunk as text; and signal the graphical display unit to display the formatted text along with an identity for the speaker.

20 Claims, 5 Drawing Sheets

(56) References Cited

U.S. PATENT DOCUMENTS

| | | | |
|---|---|---|---|
| 9,466,292 B1 | 10/2016 | Lei et al. | |
| 9,666,178 B2* | 5/2017 | Loubiere | G10L 13/00 |
| 2007/0071206 A1* | 3/2007 | Gainsboro | H04M 3/42221 |
| | | | 379/168 |
| 2007/0082706 A1 | 4/2007 | Campbell et al. | |
| 2008/0082332 A1 | 4/2008 | Mallett et al. | |
| 2008/0221886 A1 | 9/2008 | Colin et al. | |
| 2011/0006918 A1* | 1/2011 | Shafaat | G08G 5/0008 |
| | | | 340/945 |
| 2012/0010887 A1 | 1/2012 | Boregowda et al. | |
| 2016/0155435 A1* | 6/2016 | Mohideen | G10L 15/01 |
| | | | 704/235 |
| 2016/0275952 A1 | 9/2016 | Kashtan et al. | |
| 2016/0322051 A1* | 11/2016 | Milstein | H04M 3/5183 |
| 2017/0154627 A1 | 6/2017 | Michel et al. | |
| 2018/0197548 A1* | 7/2018 | Palakodety | G10L 17/06 |
| 2018/0277116 A1 | 9/2018 | Shamasundar | |
| 2019/0080697 A1 | 3/2019 | Grancharov et al. | |
| 2019/0147858 A1 | 5/2019 | Letsu-Dake et al. | |
| 2020/0175292 A1 | 6/2020 | Casado et al. | |
| 2021/0020168 A1* | 1/2021 | Dame | G10L 25/84 |
| 2021/0233411 A1* | 7/2021 | Saptharishi | G08G 5/0021 |
| 2022/0383856 A1* | 12/2022 | Nama | G10L 15/32 |

\* cited by examiner

SYSTEM AND METHOD FOR EXTRACTING AND DISPLAYING SPEAKER INFORMATION IN AN ATC TRANSCRIPTION

CROSS REFERENCE TO RELATED APPLICATION

The present application claims benefit of prior filed Indian Provisional Patent Application No. 202111023583, filed May 27, 2021, which is hereby incorporated by reference herein in its entirety.

TECHNICAL FIELD

Embodiments of the subject matter described herein relate generally to automated speech transcription. More particularly, embodiments of the subject matter relate to automated transcription of Pilot and Air Traffic Controller (ATC) conversations.

BACKGROUND

Speech transcription technology can provide machine aided transcription of spoken word to text. The use of speech transcription technology in an aviation environment, however, can be challenging. When air traffic is high, there can be multiple speakers on a communication channel including multiple controllers and multiple traffic pilots. Channel noise along with multiple speakers including different ATCs, traffic pilots and own ship pilots in a communication radio channel can pose a huge challenge for an ATC transcription system to produce reliable and accurate results. Different accents spoken by the multiple speakers can make it more difficult for an ATC transcription system to produce reliable and accurate results. Missing call signs in an ATC conversation can add to confusion.

Hence, it is desirable to provide speech transcription systems and methods for reliably and accurately transcribing over-the-air conversations between ATC and pilots while accounting for difficulties presented in an aviation environment. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a flight deck system for extracting speaker information in an ATC (Air Traffic Controller) conversation and displaying the speaker information on a graphical display unit is disclosed. The flight deck system includes a controller configured to: segment a stream of audio received over radio from an ATC and other aircraft into a plurality of chunks, wherein each chunk has a speaker; for each chunk, determine if the speaker for the chunk is enrolled as a speaker in a speaker database; when the speaker for the chunk is enrolled as a speaker in the speaker database, decode the chunk using a speaker-dependent automatic speech recognition (ASR) model that is specific for the speaker and tag the chunk with a permanent name for the speaker; when the speaker for the chunk is not enrolled as a speaker in the speaker database, assign a temporary name for the speaker of the chunk, tag the chunk with the temporary name, and decode the chunk using a speaker independent speech recognition model; format the decoded chunk as text; and signal the graphical display unit to display the formatted text along with an identity for the speaker of the formatted text, wherein the identity includes the permanent name of the speaker or the temporary name assigned to the speaker. The system is further configured to enroll a non-enrolled speaker into the speaker database and create a speaker-dependent ASR model for the non-enrolled speaker after a predetermined number of chunks of audio from the non-enrolled speaker are received.

In another embodiment, a method in a flight deck system for extracting speaker information in an ATC (Air Traffic Controller) conversation and displaying the speaker information on a graphical display unit is disclosed. The method includes: segmenting a stream of audio received over radio from an ATC and other aircraft into a plurality of chunks, wherein each chunk has a speaker; for each chunk, determining if the speaker for the chunk is enrolled as a speaker in a speaker database; when the speaker for the chunk is enrolled as a speaker in the speaker database, decoding the chunk using a speaker-dependent automatic speech recognition (ASR) model that is specific for the speaker and tagging the chunk with a permanent name for the speaker; when the speaker for the chunk is not enrolled as a speaker in the speaker database, assigning a temporary name for the speaker of the chunk, tagging the chunk with the temporary name, and decoding the chunk using a speaker independent speech recognition model; formatting the decoded chunk as text; and signaling the graphical display unit to display the formatted text along with an identity for the speaker of the formatted text, the identity including the permanent name of the speaker or the temporary name assigned to the speaker. The method further includes enrolling a non-enrolled speaker into the speaker database and creating a speaker-dependent ASR model for the non-enrolled speaker after a predetermined number of chunks of audio from the non-enrolled speaker are received.

In another embodiment, a non-transitory computer-readable medium having stored thereon instructions which when executed by one or more processors in a flight deck system causes the flight deck system to perform a method for extracting speaker information in an ATC (Air Traffic Controller) conversation and displaying the speaker information on a graphical display unit is disclosed. The method includes: segmenting a stream of audio received over radio from an ATC and other aircraft into a plurality of chunks, wherein each chunk has a speaker; for each chunk, determining if the speaker for the chunk is enrolled as a speaker in a speaker database; when the speaker for the chunk is enrolled as a speaker in the speaker database, decoding the chunk using a speaker-dependent automatic speech recognition (ASR) model that is specific for the speaker and tagging the chunk with a permanent name for the speaker; when the speaker for the chunk is not enrolled as a speaker in the speaker database, assigning a temporary name for the speaker of the chunk, tagging the chunk with the temporary name, and decoding the chunk using a speaker independent speech recognition model; formatting the decoded chunk as text; and signaling the graphical display unit to display the formatted text along with an identity for the speaker of the formatted text, the identity including the permanent name of the speaker or the temporary name assigned to the speaker.

The method further includes enrolling a non-enrolled speaker into the speaker database and creating a speaker-dependent ASR model for the non-enrolled speaker after a predetermined number of chunks of audio from the non-enrolled speaker are received.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
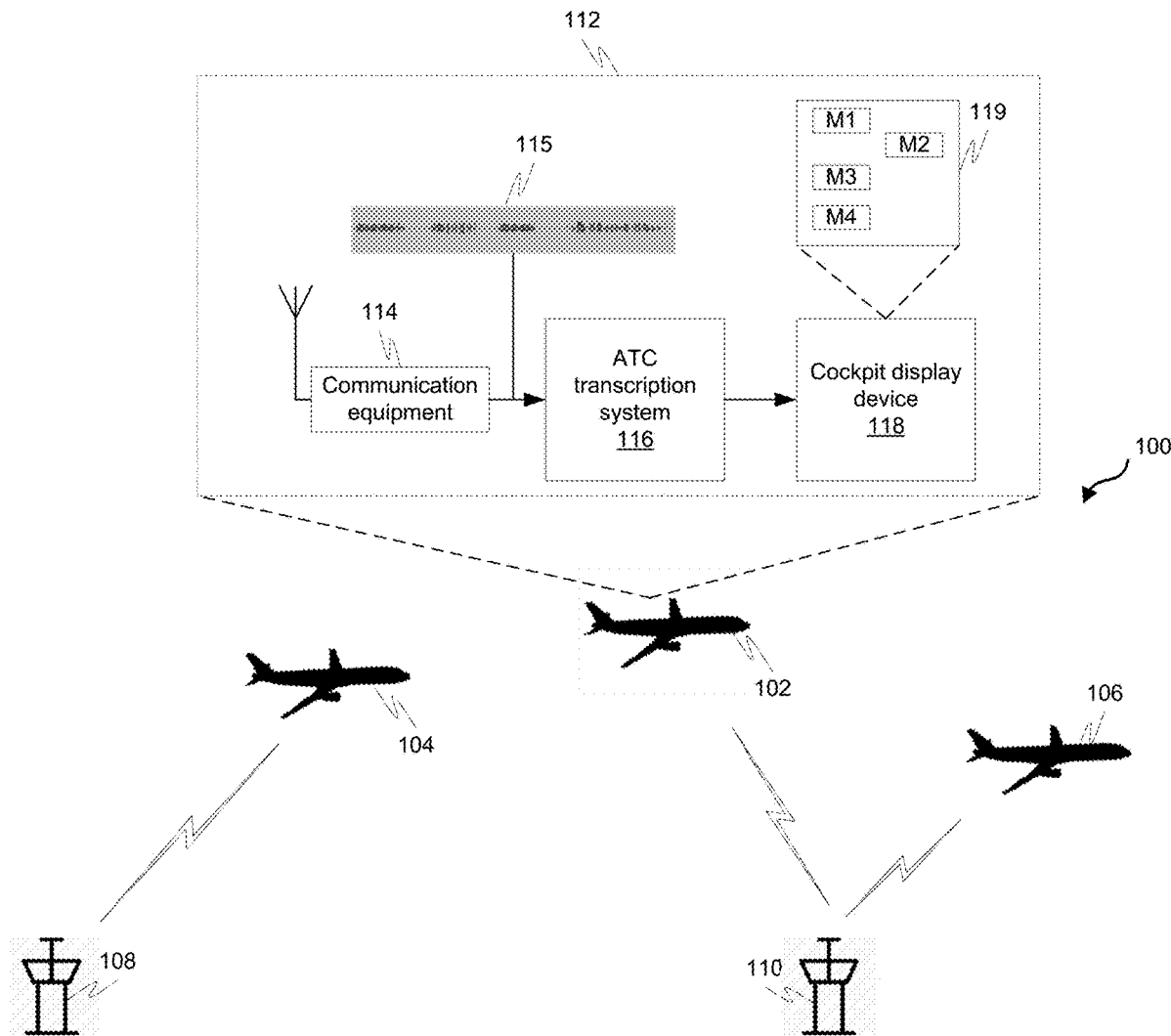
FIG. 1 is a block diagram depicting an example flight environment 100 such as one around a busy aerodrome, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical components and various processing steps. It should be appreciated that such functional and/or logical components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Speech transcription technology can provide machine aided transcription of spoken word to text. This can be very helpful in an aviation environment wherein machine aided transcription systems and methods can help a flight crew member (e.g., pilot) more quickly and better understand over-the-air communication between flight crew members (both own ship flight crew members and traffic flight crew members) and one or more air traffic controllers, especially when one or more speakers speaks with an accent and/or when communications take place in a noisy environment.

The subject matter described herein discloses apparatus, systems, techniques, and articles for identifying and classifying messages meant for own ship and for identifying and classifying messages from or directed to traffic aircraft. The apparatus, systems, techniques, and articles provided herein can contribute to more effective communication by reducing the frequency with which a pilot may have to ask a controller to clarify a misunderstood message. The apparatus, systems, techniques, and articles provided herein can assist a pilot with understanding a message from a non-native English speaker thereby reducing a pilot's workload (e.g., the workload while flying near airports can be high and during that time trying to comprehend accented ATC commands along with the radio noise can increase a pilot's workload considerably). The apparatus, systems, techniques, and articles provided herein can provide a Quick Reference Tool that can help Pilots adhere accurately to strategic ATC commands without having to remember each command. The apparatus, systems, techniques, and articles provided herein can identify the speaker in an ATC pilot conversation therefore allowing the use of a speaker-dependent speech recognition system to improve transcription accuracy. The apparatus, systems, techniques, and articles provided herein can utilize natural language processing (NLP) techniques to further refine transcription output.

FIG. 1 is a block diagram depicting an example flight environment 100 such as one around a busy aerodrome. The example environment 100 includes a plurality of aerial vehicles (own ship aircraft 102 and traffic aircraft 104, 106 in this example), but could include a variety of types of aerial vehicles such as helicopters, UAVs (unmanned aerial vehicles), and others. The example environment 100 also includes a plurality of air traffic control towers 108, 110 containing air traffic controllers (ATC) for directing ground and air traffic in the vicinity of the aerial vehicles.

The example own ship aircraft 102 includes avionics equipment 112 that receives the ongoing communications between the aerial vehicles (e.g., 102, 104, 106) and ATC (e.g., via towers 108, 110) using communication equipment 114, and presents the ongoing communications as a continuous stream of audio 115 to an ATC transcription system 116. The ATC transcription system 116 decodes the continuous stream of audio 115, generates formatted text from the decoded continuous stream of audio, and signals a cockpit display device 118 to display the generated formatted text along with an identity for the speaker of the formatted text for viewing by the flight crew onboard the own ship aircraft 102. The cockpit display device 118 may be one of many types of graphical display units onboard an aircraft such as a navigation display, a PFD (primary flight display), a PED (personal electronic device), an EFB (electronic flight bag), HUD (heads up display), HDD (heads down display), and others. The display of the formatted text may be made via a graphical display page 119 that displays each generated textual message (M1, M2, M3, M4, . . . ) in a manner that visually identifies which messages are directed to the own ship aircraft.

Figure 2:
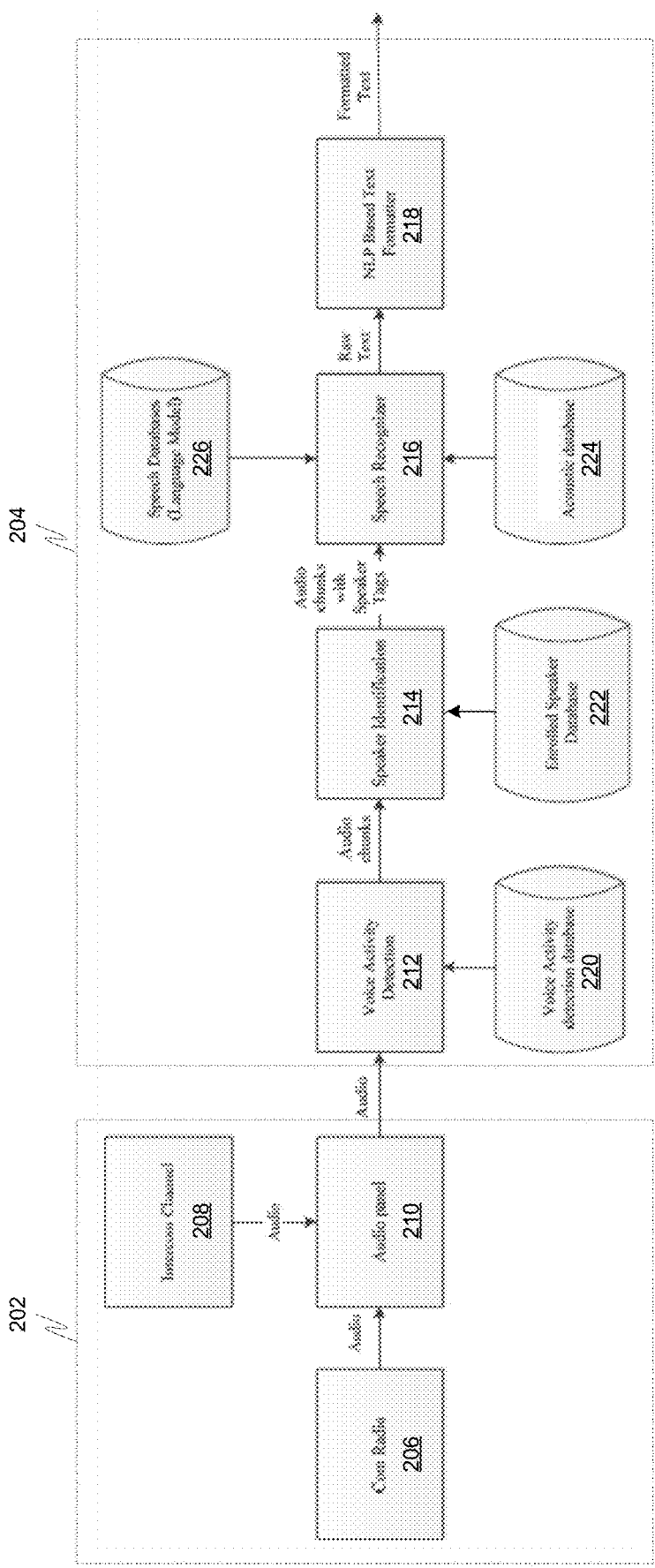
FIG. 2 is a block diagram depicting example communication equipment and an example ATC transcription system for receiving ongoing over-the-air communications and generating formatted text from the over-the-air communications for display onboard an aerial vehicle, in accordance with some embodiments.

FIG. 2 is a block diagram depicting example communication equipment 202 and an example ATC transcription system 204 for receiving ongoing over-the-air communications and generating formatted text from the over-the-air communications for display onboard an aerial vehicle. The example communication equipment 202 includes a Com radio 206 (such as that known in the art) and an intercom channel 208 (such as that known in the art) for receiving over-the-air communications between various aerial vehicles (own ship and traffic aerial vehicles) and ATC. The example communication equipment 202 also includes an audio panel 210 (such as that known in the art) for accumulating the over-the-air communications from various sources and outputting the audio from the over-the-air communications.

The example ATC transcription system 204 is configured to receive a continuous stream of audio from the communication equipment 202 (e.g., via audio panel 210) and generate formatted text therefrom for display onboard the aerial vehicle. The example ATC transcription system 204 includes a voice activity detection module 212, a speaker identification module 214, a speech recognizer module 216, and a text formatter module 218, such as an NLP (natural language processor) based text formatter module, an expert based text formatter module, or a rule based text formatter module.

Each of the voice activity detection module 212, speaker identification module 214, speech recognizer module 216, and text formatter module 218 is implemented by a processing component such as a controller (e.g., the same or separate controllers). The processing component includes at least one processor and a computer-readable storage device or media encoded with programming instructions for configuring the processing component. The processor may be any custom-made or commercially available processor, a central processing unit (CPU), a graphics processing unit (GPU), an application specific integrated circuit (ASIC), a field programmable gate array (FPGA), an auxiliary processor among several processors associated with the processing component, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processing component.

The example voice activity detection module 212 is configured to segment the received stream of audio into a plurality of chunks, wherein each chunk has a speaker. To segment the received audio into a plurality of chunks the example voice activity detection module 212 may access a voice activity detection database 220 to obtain rules for marking voiced and non-voiced boundaries in the received stream of audio and segmenting the received stream of audio into a plurality of chunks based on sentence or phrase boundaries derived from the voiced and non-voiced boundaries.

The example speaker identification module 214 is configured to determine the speaker for each chunk. The example speaker identification module 214 determines if the speaker for a chunk is enrolled as a speaker in an enrolled speaker database 222. When the speaker for the chunk is enrolled as a speaker in the enrolled speaker database 222, the example speaker identification module 214 tags the chunk with a permanent name for the speaker. When the speaker for the chunk is not enrolled as a speaker in the enrolled speaker database 222, the example speaker identification module 214 tags the chunk with a temporary name for the speaker. The example speaker identification module 214 optionally determines the language spoken by the speaker for the chunk and tags the chunk with the language.

To determine if the speaker for the chunk is enrolled as a speaker, the example speaker identification module 214 is configured extract speaker-based features from the audio (such as speaker embeddings, or vocal cord and prosody based features like pitch, articulation, speed, modulation, etc.); generate a plurality of similarity scores for the extracted speaker-based features based on a comparison of the extracted speaker-based features with a plurality of model files in the enrolled speaker database 222 for a plurality of speakers from the enrolled speaker database 222; and when a specific similarity score determined based on the comparison of the extracted speaker-based features to a model file for a particular speaker in the enrolled speaker database 222 exceeds a threshold level, associate the chunk with the particular speaker.

The example speaker identification module 214 is further configured to save the extracted speaker-based features for the chunk as a model file for a speaker in the enrolled speaker database 222 with a temporary name when none of the plurality of similarity scores for the extracted speaker-based features exceeds the threshold level. The model file for the extracted speaker-based features for a speaker with a temporary name can be saved until a predetermined number of chunks of audio are reached.

The example speaker identification module 214 is further configured to enroll previously unenrolled speakers into the enrolled speaker database 222. When the speaker for a chunk is not enrolled as a speaker in the enrolled speaker database 222, the speaker identification module 214 is configured to: accumulate a predetermined number of chunks of audio that are tagged with the same temporary name, and when the predetermined number of chunks is reached, generate a speaker dependent ASR model for the speaker with the temporary name using the predetermined number of accumulated chunks, store the speaker dependent ASR model in an acoustic database 224, and enroll the speaker with the temporary name along with the corresponding extracted speaker-based features as a model file in the enrolled speaker database 222.

To accumulate a predetermined number of chunks of audio that are tagged with the same temporary name, the example speaker identification module 214 is configured to extract speaker-based features by taking a portion of a chunk of audio with a duration length set by pre-determined threshold (e.g., 60 sec but this threshold can be optimized to a lower value) and processing the portion to create a vector that consist of speaker characteristics, such as speaker embeddings, or vocal cord and prosody based features like pitch, articulation, speed, modulation, etc. This speaker vector is unique and can contain speaker features regarding accent/dialect, speech rate, pitch, tempo, articulation activity, pauses, phonetic variations, etc. associated with the speaker. The name of each speaker along with its corresponding features are saved as a separate model file or alternatively combined based on similarity into one file. These model files are used by the speaker identification module 214 to identify the speaker based on input audio.

To accumulate a predetermined number of chunks of audio that are tagged with the same temporary name, the example speaker identification module 214 is further configured to generate a similarity score for the extracted speaker-based features based on a comparison of the extracted speaker-based features with the model file for the speaker with the temporary name; and when the similarity score determined based on the comparison of the extracted speaker-based features to the model file for the speaker with the temporary name exceeds a threshold level, associate the chunk with the speaker with the temporary name.

The example speaker identification module 214 may further allow a flight crew member (e.g., pilot) to generate a replacement name for a temporary name by editing an auto generated temporary name, assigning tags based on, for example, call sign, or simply assigning labels such as ATC1 or TP1 or traffic pilot1.

Figure 3:
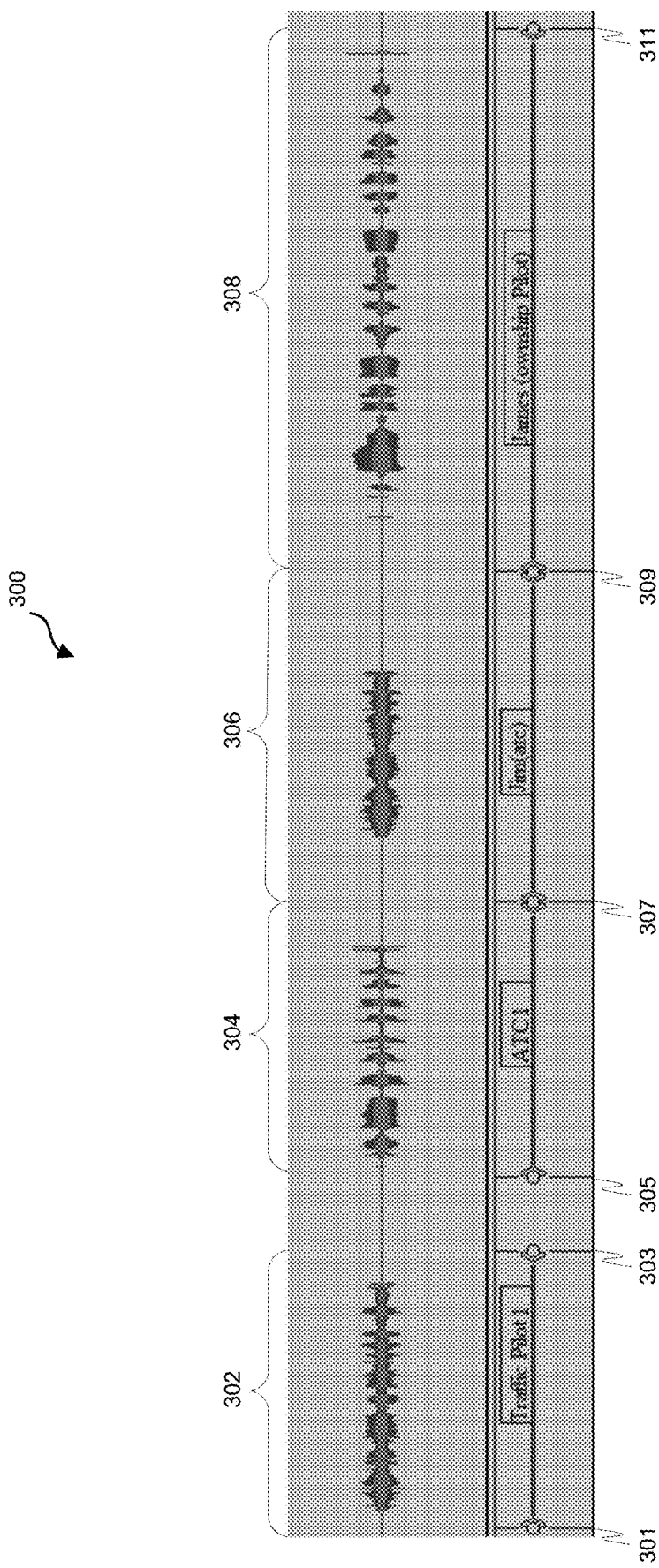
FIG. 3 is a diagram illustrating an example tagging of chunks of audio in a stream of audio, in accordance with some embodiments.

FIG. 3 is a diagram illustrating an example tagging of chunks of audio in a stream of audio 300. In this example, four chunks of audio (302, 304, 306, 308) are presented in the stream of audio 300. The example voice activity detection module 212 is configured to segment the received stream of audio 300 into the four chunks (302, 304, 306, 308). The example voice activity detection module 212 can identify boundaries (301, 303, 305, 307, 309, 311) for the chunks (302, 304, 306, 308). The example speaker identification module 214 can then determine the speaker of each chunk (302, 304, 306, 308). In this example, the first chunk 302 is bounded by boundaries (301, 303) and is associated with Traffic Pilot 1 as the speaker; the second chunk 304 is bounded by boundaries (305, 307) and is associated with ATC1 as the speaker; the third chunk 306 is bounded by boundaries (307, 309) and is associated with Jim (ATC) as the speaker; and the fourth chunk 308 is bounded by boundaries (309, 311) and is associated with James (own ship Pilot) as the speaker.

Referring again to FIG. 2, the example speech recognizer module 216 is configured to decode the tagged chunks of audio using speech recognition techniques to convert the tagged chunks of audio into raw text. When the speaker for a chunk is enrolled as a speaker in the enrolled speaker database 222, a corresponding speaker-dependent automatic speech recognition (ASR) model has been provided in the acoustic database 224, and the example speech recognizer module 216 is configured to decode the chunk as raw text using a speaker-dependent ASR model that is specific for the speaker and optionally a language model (e.g., stored in speech database 226) that relates to a group of words or vocabulary recognized from the chunk with its pronunciation or lexical variations. Speaker based models can provide better performance in terms of accuracy and speed in text decoding as compared to generic or speaker independent models. When the speaker for a chunk is not enrolled as a speaker in the enrolled speaker database 222, a corresponding speaker-dependent ASR model has not been provided in the acoustic database 224, and the example speech recognizer module 216 is configured to decode the chunk using a speaker-independent ASR model provided in the acoustic database 224 that is generic and optionally a language model (e.g., stored in speech database 226). The speaker-dependent ASR model can be configured using known techniques in the art such as speaker adaptation. The speaker-based ASR models can be constrained with vocabulary that can be spoken by either ATC or flight crew members, so not only accuracy, but latency of speech recognition will improve.

The example speech recognizer module 216 may also be configured to decode the tagged chunks of audio using a language model in a speech database 226. The language model may be used for the chunk to account for lexical variations in phrases that may be represented in the chunk. The example speech recognizer module 216 is configured to output raw text from its decoding operations.

The example speech recognizer module 216 may be implemented using machine learning techniques such as deep neural networks that can use speaker dependent and speaker independent models, statistical techniques that can use speaker dependent and speaker independent models, rule-based systems that can use speaker dependent and speaker independent models, and others.

An example NLP based text formatter module 218 is configured to format the raw text as formatted text using natural language processing techniques, such as deep learning techniques, text embeddings, machine translation, neural machine translation (NMT), recurrent neural network (RNN), long short-term memory (LTSM) networks, gated recurrent units (GRU), bidirectional encoder representations from transformers (BERT), generative pre-trained transformer (GPT), XLNET, and others.

The example text formatter module 218 is further configured to signal the graphical display unit to display the formatted text along with an identity for the speaker of the formatted text wherein the identity includes the permanent name of the speaker or the temporary name assigned to the speaker. The example text formatter module 218 may be further configured to signal the graphical display unit to display the identity for the speaker of the formatted text using the replacement name, when flight crew member initiated substitution of a temporary name with a flight crew member inputted replacement name has been received.

The example ATC transcription system 204 may continuously update the enrolled speaker database 222 with the enrollment of unknown speakers and the acoustic database 224 with speaker dependent speech recognition models, iteratively. The example ATC transcription system 204 can use the speaker identification information to filter out the transcription of conversations involving traffic pilots and/or specific ATC when needed to allow for the display and/or recording of conversations involving only the own ship pilot or optionally only with the own ship pilot and select traffic pilots.

The example ATC transcription system 204 may allow the own ship pilot to filter out messages for a selected traffic pilot or selected ATC based on speaker information. The example ATC transcription system 204 is configured to automatically enroll own ship pilots thus allowing the system to distinguish own ship pilots from other traffic pilots.

The example ATC transcription system 204 is also configured to automatically store ATC speaker information along with flight path information and automatically enroll the ATCs the own ship is likely to encounter along the flight path. Because there is a lot of conversation between an own ship pilot and ATC, there should be enough voice data available to enroll different ATCs along various flight legs. During flight, a lot of conversations between a traffic pilot and an ATC may take place and the example ATC transcription system 204 is configured to mark voice messages by the traffic pilot as being from an unknown speaker with an arbitrary label such as X or Y. The example ATC transcription system 204 is configured to provide a user interface to allow the own ship pilot to edit arbitrary labels and relabel them with a label such as Traffic pilot1, TP1 or by callsign for traffic pilot messages and ATC1 for an ATC. This editing feature for labels will help pilots in future flights as these edited labels or tags are stored by the example ATC transcription system 204 with flight route information and GPS information. Consequently, the example ATC transcription system 204 can provide, for future flights on same route, various ATCs and scheduled traffic pilots as enrolled speakers. Also, this labeling can help in post flight analytics.

The example ATC transcription system 204 is configured to signal the graphical display unit to display, along with the formatted text and the identity (e.g., automatically generated and pilot edited speaker tags) for the speaker of the formatted text, extracted information including count and duration of messages for the speaker of the formatted text, number of total speakers during flight journey, percentage of messages in the flight journey for the speaker of the formatted text, and other extracted information.

The output of the example ATC transcription system 204 can be displayed based on speaker tagged information in different colors, shapes, or font sizes (visual attributes). The speaker information logged by the example ATC transcription system 204 may be useful for post flight analysis and recreating a flight scenario.

Figure 4:
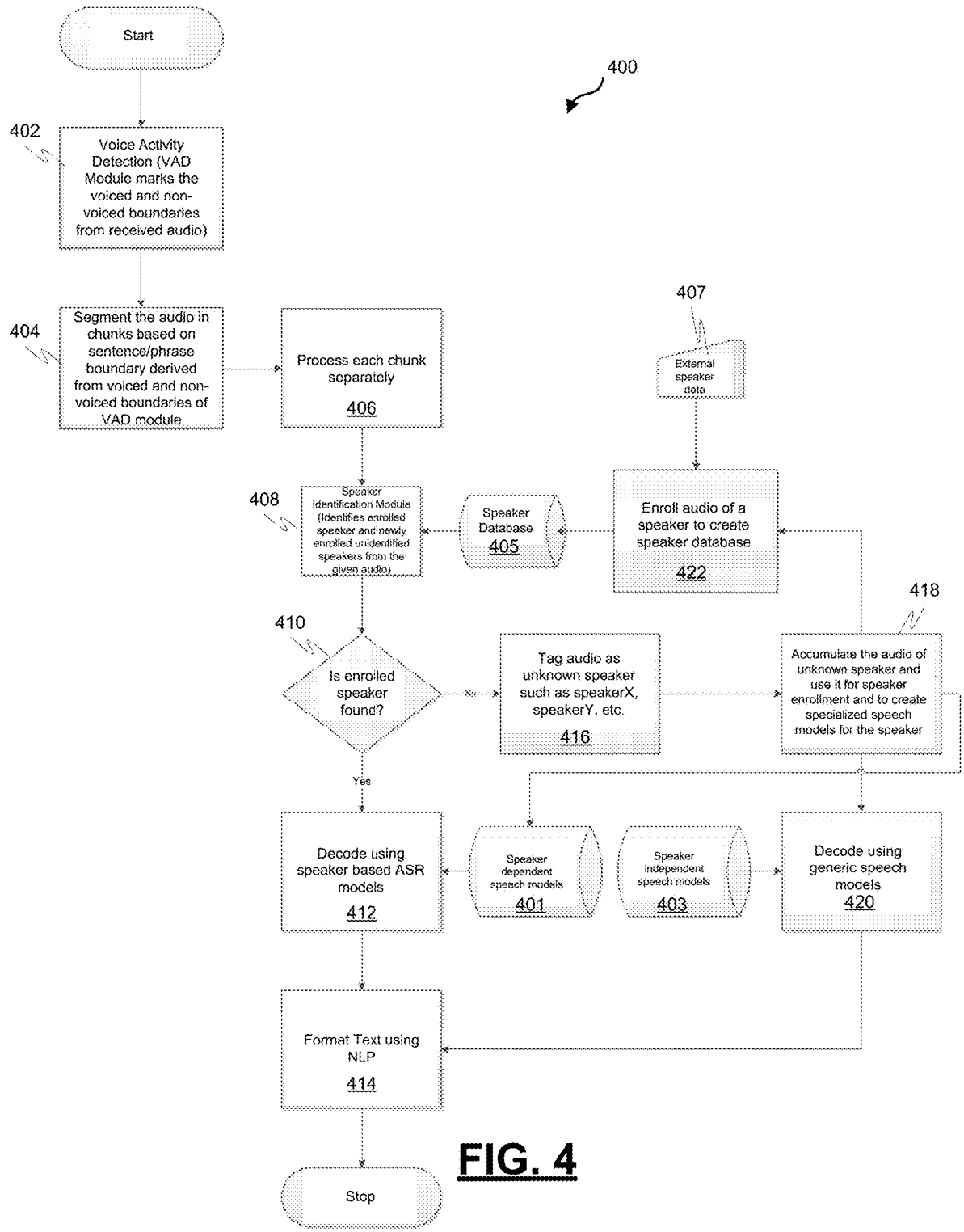
FIG. 4 is a process flow chart depicting an example process for extracting speaker information in an ATC transcription and generating speaker information for display to flight crew, in accordance with some embodiments.

FIG. 4 is a process flow chart depicting an example process 400 for extracting speaker information in an ATC transcription and generating speaker information for display to flight crew. The order of operation within the process 400 is not limited to the sequential execution as illustrated in the figure but may be performed in one or more varying orders as applicable and in accordance with the present disclosure.

The example process 400 includes voice activity detection (VAD) wherein a VAD module marks the voice and non-voiced boundaries from received audio (operation 402), segmenting the audio in chunks based on sentence/phrase boundary derived from voiced and non-voiced boundaries of VAD (operation 404) and processing each chunk separately (operation 406).

The example process 400 includes identifying, via a speaker identification module, enrolled speaker and newly enrolled unidentified speakers (in the speaker database 405) from the given audio (operation 408).

The example process 400 includes determining whether an enrolled speaker is found (decision 410). If an enrolled speaker is found, yes at decision 410, then the example process 400 includes decoding audio into raw text using a speaker-based ASR model 401 (operation 412) and formatting the raw text into formatted text using natural language processing (operation 414).

If an enrolled speaker is not found, no add decision for 410, then the example process 400 includes tagging audio as having an unknown speaker (such as speaker X, speaker Y, etc.) (operation 416), accumulating the audio of an unknown speaker and using it for speaker enrollment and to create specialized speech models 401 for the speaker (operation 418), decoding the audio into raw text using a generic speech model 403 (operation 420), and formatting the raw text into formatted text using natural language processing (operation 414).

The example process 400 also includes enrolling the audio of an unenrolled speaker to create and/or update a speaker database 405 (operation 422). External speaker data 407 may be used to enroll audio of a speaker to create the speaker database. The example process 400 ends after formatting text using natural language processing.

Figure 5:
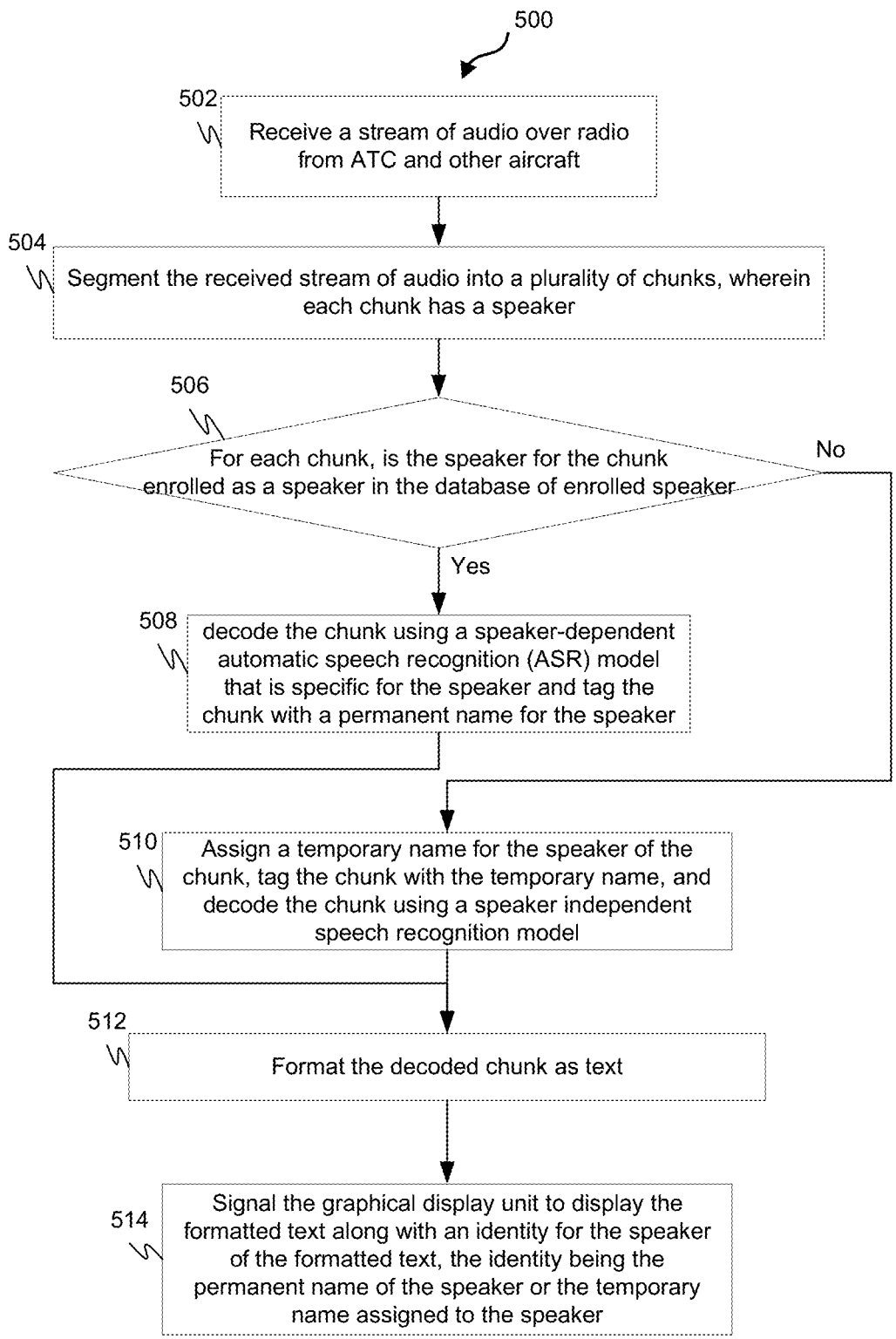
FIG. 5 is a process flow chart depicting an example process for extracting speaker information in an ATC transcription and displaying the speaker information on a graphical display unit, in accordance with some embodiments.

FIG. 5 is a process flow chart depicting an example process 500 for extracting speaker information in an ATC transcription and displaying the speaker information on a graphical display unit. The order of operation within the process 500 is not limited to the sequential execution as illustrated in the figure but may be performed in one or more varying orders as applicable and in accordance with the present disclosure.

The example process 500 includes receiving a stream of audio over radio from ATC and other aircraft (operation 502) and segmenting the received stream of audio into a plurality of chunks, wherein each chunk has a speaker (operation 504). The segmenting the received audio into a plurality of chunks may comprise marking voiced and non-voiced boundaries in the received stream of audio and segmenting the received stream of audio into a plurality of chunks based on sentence or phrase boundaries derived from the voiced and non-voiced boundaries.

The example process 500 includes determining, for each chunk, if the speaker for the chunk is enrolled as a speaker in a speaker database (decision 506). Determining if the speaker for the chunk is enrolled as a speaker may comprise: extracting speaker-based features from the audio; generating a plurality of similarity scores for the extracted speaker-based features based on a comparison of the extracted speaker-based features with a plurality of model files for a plurality of speakers; and when a specific similarity score determined based on the comparison of the extracted speaker-based features to a model file for a particular speaker exceeds a threshold level, associating the chunk with the particular speaker.

When the speaker for the chunk is enrolled as a speaker in a speaker database (yes at decision 506), the example process 500 includes decoding the chunk using a speaker-dependent automatic speech recognition (ASR) model that is specific for the speaker and tag the chunk with a permanent name for the speaker (operation 508). The decoding may comprise decoding the chunk as raw text.

When the speaker for the chunk is not enrolled as a speaker in a speaker database (no at decision 506), the example process 500 includes assigning a temporary name for the speaker of the chunk, tag the chunk with the temporary name, and decoding the chunk using a speaker independent speech recognition model (operation 510). When the speaker for a chunk is not enrolled as a speaker in the speaker database, the method may further comprise: accumulating a predetermined number of chunks of audio that are tagged with the same temporary name; and when the predetermined number of chunks is reached, generating a speaker dependent ASR model for the speaker with the temporary name using the predetermined number of accumulated chunks; and enrolling the speaker with the temporary name and the speaker dependent ASR model for the speaker with the temporary name in the speaker database. The method may further allow a flight crew member (e.g., pilot) to generate a replacement name by editing an auto generated temporary name, assigning tags based on, for example, call sign, or simply assigning labels such as ATC1 or TP1 or traffic pilot1.

The example process 500 includes formatting the decoded chunk as text (operation 512). The formatting the decoded chunk may comprise formatting raw text as formatted text using natural language processing.

The example process 500 includes signaling a graphical display unit to display the formatted text along with an identity for the speaker of the formatted text, the identity comprising the permanent name of the speaker or the temporary name assigned to the speaker (operation 514). The method may further include receiving flight crew member initiated substitution of a temporary name with a flight crew member inputted replacement name and signaling the graphical display unit to display the identity for the speaker of the formatted text using the replacement name.

In one embodiment, a flight deck system for extracting speaker information in an ATC (Air Traffic Controller) conversation and displaying the speaker information on a graphical display unit is provided. The flight deck system comprises a controller configured to: segment a stream of audio received over radio from an ATC and other aircraft into a plurality of chunks, wherein each chunk has a speaker; for each chunk, determine if the speaker for the chunk is enrolled as a speaker in a speaker database; when the speaker for the chunk is enrolled as a speaker in the speaker database, decode the chunk using a speaker-dependent automatic speech recognition (ASR) model that is specific for the speaker and tag the chunk with a permanent name for the speaker; when the speaker for the chunk is not enrolled as a speaker in the speaker database, assign a temporary name for the speaker of the chunk, tag the chunk with the temporary name, and decode the chunk using a speaker independent speech recognition model; format the decoded chunk as text; and signal the graphical display unit to display the formatted text along with an identity for the speaker of the formatted text, wherein the identity comprises the permanent name of the speaker or the temporary name assigned to the speaker. The system is further configured to enroll a non-enrolled speaker into the speaker database and create a speaker-dependent ASR model for the non-enrolled speaker after a predetermined number of chunks of audio from the non-enrolled speaker are received.

These aspects and other embodiments may include one or more of the following features. The controller may be further configured to receive flight crew member initiated substitution of a temporary name with a flight crew member inputted replacement name; and signal the graphical display unit to display the identity for the speaker of the formatted text using the replacement name. To segment the received audio into a plurality of chunks the controller may be configured to: mark voiced and non-voiced boundaries in the received stream of audio; and segment the received stream of audio into a plurality of chunks based on sentence or phrase boundaries derived from the voiced and non-voiced boundaries. When the speaker for a chunk is not enrolled as a speaker in the speaker database, the controller may be further configured to: accumulate a predetermined number of chunks of audio that are tagged with the same temporary name; and when the predetermined number of chunks is reached, generate a speaker dependent ASR model for the speaker with the temporary name using the predetermined number of accumulated chunks; and enroll the speaker with the temporary name and the speaker dependent ASR model for the speaker with the temporary name in the speaker database. To decode the chunk, the controller may be configured to decode the chunk as raw text. To format the decoded chunk the controller may be configured to format the raw text as formatted text using natural language processing. The controller may be configured to generate speaker dependent ASR by speaker adaptation. To determine if the speaker for the chunk is enrolled as a speaker the controller may be configured to: extract speaker-based features from the audio; generate a plurality of similarity scores for the extracted speaker-based features based on a comparison of the extracted speaker-based features with a plurality of model files for a plurality of speakers; and when a specific similarity score determined based on the comparison of the extracted speaker-based features to a model file for a particular speaker exceeds a threshold level, associate the chunk with the particular speaker. The controller may be further configured to save the extracted speaker-based features for the chunk as a model file for a speaker with a temporary name when none of the plurality of similarity scores for the extracted speaker-based features exceeds the threshold level. To accumulate a predetermined number of chunks of audio that are tagged with the same temporary name the controller may be configured to: generate a similarity score for the extracted speaker-based features based on a comparison of the extracted speaker-based features with the model file for the speaker with the temporary name; and when the similarity score determined based on the comparison of the extracted speaker-based features to the model file for the speaker with the temporary name exceeds a threshold level, associate the chunk with the speaker with the temporary name. The controller may be further configured to update the speaker database with the enrollment of unknown speakers and speaker dependent speech recognition models iteratively. To decode the chunk the controller may be configured to decode the chunk as raw text and to format the decoded chunk the controller may be configured to format the raw text as formatted text using natural language processing, an expert system, or a rule-based system. The controller may be further configured to signal the graphical display unit to display, along with the formatted text and the identity for the speaker of the formatted text, extracted information including count and duration of messages for the speaker of the formatted text, number of total speakers during flight journey, and percentage of messages in the flight journey for the speaker of the formatted text. To signal the graphical display unit to display the formatted text along with an identity for the speaker of the formatted text, the controller may be configured to: filter out ATC conversations with traffic aircraft based on flight crew member inputted filter criteria; and signal the graphical display unit to display the formatted text along with an identity for the speaker of the formatted text for ATC conversations that were not filtered out.

In another embodiment, a method in a flight deck system for extracting speaker information in an ATC (Air Traffic Controller) conversation and displaying the speaker information on a graphical display unit is provided. The method comprises: segmenting a stream of audio received over radio from an ATC and other aircraft into a plurality of chunks, wherein each chunk has a speaker; for each chunk, determining if the speaker for the chunk is enrolled as a speaker in a speaker database; when the speaker for the chunk is enrolled as a speaker in the speaker database, decoding the chunk using a speaker-dependent automatic speech recognition (ASR) model that is specific for the speaker and tagging the chunk with a permanent name for the speaker; when the speaker for the chunk is not enrolled as a speaker in the speaker database, assigning a temporary name for the speaker of the chunk, tagging the chunk with the temporary name, and decoding the chunk using a speaker independent speech recognition model; formatting the decoded chunk as text; and signaling the graphical display unit to display the formatted text along with an identity for the speaker of the formatted text, the identity comprising the permanent name of the speaker or the temporary name assigned to the speaker. The method further comprises enrolling a non-enrolled speaker into the speaker database and creating a speaker-dependent ASR model for the non-enrolled speaker after a predetermined number of chunks of audio from the non-enrolled speaker are received.

These aspects and other embodiments may include one or more of the following features. The segmenting the received audio into a plurality of chunks may comprise marking voiced and non-voiced boundaries in the received stream of audio; and segmenting the received stream of audio into a plurality of chunks based on sentence or phrase boundaries derived from the voiced and non-voiced boundaries. When the speaker for a chunk is not enrolled as a speaker in the speaker database, the method may further comprise: accumulating a predetermined number of chunks of audio that are tagged with the same temporary name; and when the predetermined number of chunks is reached, generating a speaker dependent ASR model for the speaker with the temporary name using the predetermined number of accumulated chunks; and enrolling the speaker with the temporary name and the speaker dependent ASR model for the speaker with the temporary name in the speaker database. The decoding may comprise decoding the chunk as raw text. The formatting the decoded chunk may comprise formatting the raw text as formatted text using natural language processing. The determining if the speaker for the chunk is enrolled as a speaker may comprise: extracting speaker-based features from the audio; generating a plurality of similarity scores for the extracted speaker-based features based on a comparison of the extracted speaker-based features with a plurality of model files for a plurality of speakers; and when a specific similarity score determined based on the comparison of the extracted speaker-based features to a model file for a particular speaker exceeds a threshold level, associating the chunk with the particular speaker. The method may further comprise saving the extracted speaker-based features for the chunk as a model file for a speaker with a temporary name when none of the plurality of similarity scores for the extracted speaker-based features exceeds the threshold level. The accumulating a predetermined number of chunks of audio that are tagged with the same temporary name may comprise: generating a similarity score for the extracted speaker-based features based on a comparison of the extracted speaker-based features with the model file for the speaker with the temporary name; and when the similarity score determined based on the comparison of the extracted speaker-based features to the model file for the speaker with the temporary name exceeds a threshold level, associating the chunk with the speaker with the temporary name. The method may further comprise updating the speaker database with the enrollment of unknown speakers and speaker dependent speech recognition models iteratively. The method may further comprise receiving flight crew member initiated substitution of a temporary name with a flight crew member inputted replacement name; and signaling the graphical display unit to display the identity for the speaker of the formatted text using the replacement name. The decoding may comprise decoding the chunk as raw text; and the formatting the decoded chunk may comprise formatting the raw text as formatted text using natural language processing, an expert system, or a rule-based system. The method may further comprise signaling the graphical display unit to display, along with the formatted text and the identity for the speaker of the formatted text, extracted information including count and duration of messages for the speaker of the formatted text, number of total speakers during flight journey, and percentage of messages in the flight journey for the speaker of the formatted text. The signaling the graphical display unit to display the formatted text along with an identity for the speaker of the formatted text may further comprise: filtering out ATC conversations with traffic aircraft based on flight crew member inputted filter criteria; and signaling the graphical display unit to display the formatted text along with an identity for the speaker of the formatted text for ATC conversations that were not filtered out.

In another embodiment, provide is a non-transitory computer-readable medium having stored thereon instructions which when executed by one or more processors in a flight deck system causes the flight deck system to perform a method for extracting speaker information in an ATC (Air Traffic Controller) conversation and displaying the speaker information on a graphical display unit. The method comprises: segmenting a stream of audio received over radio from an ATC and other aircraft into a plurality of chunks, wherein each chunk has a speaker; for each chunk, determining if the speaker for the chunk is enrolled as a speaker in a speaker database; when the speaker for the chunk is enrolled as a speaker in the speaker database, decoding the chunk using a speaker-dependent automatic speech recognition (ASR) model that is specific for the speaker and tagging the chunk with a permanent name for the speaker; when the speaker for the chunk is not enrolled as a speaker in the speaker database, assigning a temporary name for the speaker of the chunk, tagging the chunk with the temporary name, and decoding the chunk using a speaker independent speech recognition model; formatting the decoded chunk as text; and signaling the graphical display unit to display the formatted text along with an identity for the speaker of the formatted text, the identity comprising the permanent name of the speaker or the temporary name assigned to the speaker. The method further comprises enrolling a non-enrolled speaker into the speaker database and creating a speaker-dependent ASR model for the non-enrolled speaker after a predetermined number of chunks of audio from the non-enrolled speaker are received.

In another embodiment, a flight deck system for extracting speaker information in an ATC (Air Traffic Controller) conversation and displaying the speaker information on a graphical display unit is provided. The flight deck system comprises a controller configured to: receive a continuous stream of audio over radio from ATC and other aircraft; mark voiced and non-voiced boundaries in the received audio; segment the received audio into a plurality of chunks based on sentence/phrase boundaries derived from voiced and non-voiced boundaries; for each chunk, determine if the speaker for the chunk is enrolled as a speaker in a speaker database; when the speaker for the chunk is enrolled as a speaker in the speaker database, decode the chunk using a speaker-dependent automatic speech recognition (ASR) model that is specific for the speaker and tag the chunk with a permanent name for the speaker; when the speaker for the chunk is not enrolled as a speaker in the speaker database: assign a temporary name for the speaker of the chunk; tag the chunk with the temporary name; decode the chunk using a speaker independent speech recognition model; accumulate a predetermined number of chunks of audio that are tagged with the temporary name; and when the predetermined number of chunks is reached, enroll the speaker with the temporary name and the predetermined number of accumulated chunks in the speaker database and generate a speaker dependent ASR model using the predetermined number of accumulated chunks; format the decoded chunk as text using natural language processing; and display the formatted text on the graphical display unit along with the identity of the speaker for the formatted text, the identity comprising the permanent name of the speaker or the temporary name assigned to the speaker. The system is further configured to enroll a non-enrolled speaker into the speaker database and create a speaker-dependent ASR model for the non-enrolled speaker after a predetermined number of chunks of audio from the non-enrolled speaker are received.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. A software may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight deck system for extracting speaker information in an ATC (Air Traffic Controller) conversation and displaying the speaker information on a graphical display unit, the flight deck system comprising a controller configured to:
   segment a stream of audio received over radio from an ATC and other aircraft into a plurality of chunks, wherein each chunk has a speaker;
   extract vocal cord and prosody based features from a chunk;
   generate a plurality of similarity scores for the extracted vocal cord and prosody based features for the chunk, wherein each similarity score of the plurality of similarity scores is based on a comparison of the extracted vocal cord and prosody based features for the chunk with a different model file from a plurality of model files in an enrolled speaker database for a plurality of speakers from the enrolled speaker database, wherein the plurality of model files are associated with different speakers from the enrolled speaker database;

when a specific similarity score from the plurality of similarity scores determined based on the comparison of the extracted vocal cord and prosody based features with the plurality of model files in the enrolled speaker database for the plurality of speakers exceeds a threshold level, associate the chunk with a particular speaker from the enrolled speaker database, decode the chunk using a speaker-dependent automatic speech recognition (ASR) model that is specific for the speaker, and tag the chunk with a permanent name for the speaker;

when a specific similarity score from the plurality of similarity scores determined based on the comparison of the extracted vocal cord and prosody based features with the plurality of model files in the enrolled speaker database for the plurality of speakers does not exceed a threshold level, assign a temporary name for the speaker of the chunk, tag the chunk with the temporary name, and decode the chunk using a speaker independent speech recognition model;

format the decoded chunk as text;

signal the graphical display unit to display the formatted text along with an identity for the speaker of the formatted text, the identity comprising the permanent name of the speaker, or the temporary name assigned to the speaker; and enroll a non-enrolled speaker into the speaker database and create a speaker-dependent ASR model for the non-enrolled speaker after a predetermined number of chunks of audio from the non-enrolled speaker are received.

2. The flight deck system of claim 1, wherein the controller is further configured to:
receive flight crew member initiated substitution of a temporary name with a flight crew member inputted replacement name; and
signal the graphical display unit to display the identity for the speaker of the formatted text using the replacement name.

3. The flight deck system of claim 1, wherein when the speaker for a chunk is not enrolled as a speaker in the speaker database, the controller is further configured to:
accumulate a predetermined number of chunks of audio that are tagged with a same temporary name; and
when the predetermined number of chunks is reached,
generate a speaker dependent ASR model for the speaker with the temporary name using the predetermined number of accumulated chunks; and
enroll the speaker with the temporary name and the speaker dependent ASR model for the speaker with the temporary name in the speaker database.

4. The flight deck system of claim 1, wherein:
to decode the chunk the controller is configured to decode the chunk as raw text; and
to format the decoded chunk the controller is configured to format the raw text as formatted text using natural language processing, an expert system, or a rule-based system.

5. The flight deck system of claim 1, wherein the controller is further configured to signal the graphical display unit to display, along with the formatted text and the identity for the speaker of the formatted text, extracted information including count and duration of messages for the speaker of the formatted text, number of total speakers during a flight journey, and percentage of messages in the flight journey for the speaker of the formatted text.

6. The flight deck system of claim 1, wherein the controller is further configured to save the extracted vocal cord and prosody based features for the chunk as a model file for a speaker with a temporary name when none of the plurality of similarity scores for the extracted vocal cord and prosody based features exceeds the threshold level.

7. The flight deck system of claim 6, wherein to accumulate a predetermined number of chunks of audio that are tagged with a same temporary name the controller is configured to:
generate a similarity score for the extracted vocal cord and prosody based features based on a comparison of the extracted vocal cord and prosody based features with the model file for the speaker with the temporary name; and
when the similarity score determined based on the comparison of the extracted vocal cord and prosody based features to the model file for the speaker with the temporary name exceeds a threshold level, associate the chunk with the speaker with the temporary name.

8. The flight deck system of claim 7, wherein the controller is further configured to update the speaker database with the enrollment of unknown speakers and speaker dependent speech recognition models iteratively.

9. The flight deck system of claim 1, wherein to signal the graphical display unit to display the formatted text along with an identity for the speaker of the formatted text the controller is configured to:
filter out ATC conversations with traffic aircraft based on flight crew member inputted filter criteria; and
signal the graphical display unit to display the formatted text along with an identity for the speaker of the formatted text for ATC conversations that were not filtered out.

10. A method in a flight deck system for extracting speaker information in an ATC (Air Traffic Controller) conversation and displaying the speaker information on a graphical display unit, the method comprising:
segmenting a stream of audio received over radio from an ATC and other aircraft into a plurality of chunks, wherein each chunk has a speaker;
extracting vocal cord and prosody based features from a chunk;
generating a plurality of similarity scores for the extracted vocal cord and prosody based features for the chunk, wherein each similarity score of the plurality of similarity scores is based on a comparison of the extracted vocal cord and prosody based features for the chunk with a different model file from a plurality of model files in an enrolled speaker database for a plurality of speakers from the enrolled speaker database, wherein the plurality of model files are associated with different speakers from the enrolled speaker database;
when a specific similarity score from the plurality of similarity scores determined based on the comparison of the extracted vocal cord and prosody based features with the plurality of model files in the enrolled speaker database for the plurality of speakers exceeds a threshold level, associate the chunk with a particular speaker from the enrolled speaker database, decoding the chunk using a speaker-dependent automatic speech recognition (ASR) model that is specific for the speaker and tagging the chunk with a permanent name for the speaker;
when a specific similarity score from the plurality of similarity scores determined based on the comparison of the extracted vocal cord and prosody based features with the plurality of model files in the enrolled speaker database for the plurality of speakers does not exceed a threshold level, assigning a temporary name for the speaker of the chunk, tagging the chunk with the temporary name, and decoding the chunk using a speaker independent speech recognition model;

formatting the decoded chunk as text;

signaling the graphical display unit to display the formatted text along with an identity for the speaker of the formatted text, the identity comprising the permanent name of the speaker or the temporary name assigned to the speaker; and enrolling a non-enrolled speaker into the speaker database and creating a speaker-dependent ASR model for the non-enrolled speaker after a predetermined number of chunks of audio from the non-enrolled speaker are received.

11. The method of claim 10, further comprising:

receiving flight crew member initiated substitution of a temporary name with a flight crew member inputted replacement name; and signaling the graphical display unit to display the identity for the speaker of the formatted text using the replacement name.

12. The method of claim 10, wherein when the speaker for a chunk is not enrolled as a speaker in the speaker database, the method further comprises:

accumulating a predetermined number of chunks of audio that are tagged with a same temporary name; and when the predetermined number of chunks is reached, generating a speaker dependent ASR model for the speaker with the temporary name using the predetermined number of accumulated chunks; and enrolling the speaker with the temporary name and the speaker dependent ASR model for the speaker with the temporary name in the speaker database.

13. The method of claim 10, wherein:

the decoding comprises decoding the chunk as raw text; and the formatting the decoded chunk comprises formatting the raw text as formatted text using natural language processing, an expert system, or a rule-based system.

14. The method of claim 10, further comprising signaling the graphical display unit to display, along with the formatted text and the identity for the speaker of the formatted text, extracted information including count and duration of messages for the speaker of the formatted text, number of total speakers during a flight journey, and percentage of messages in the flight journey for the speaker of the formatted text.

15. The method of claim 10, wherein the method further comprises saving the extracted vocal cord and prosody based features for the chunk as a model file for a speaker with a temporary name when none of the plurality of similarity scores for the extracted vocal cord and prosody based features exceeds the threshold level.

16. The method of claim 15, further comprising accumulating a predetermined number of chunks of audio that are tagged with a same temporary name and wherein the accumulating a predetermined number of chunks of audio that are tagged with the same temporary name comprises:

generating a similarity score for the extracted vocal cord and prosody based features based on a comparison of the extracted vocal cord and prosody based features with the model file for the speaker with the temporary name; and when the similarity score determined based on the comparison of the extracted vocal cord and prosody based features to the model file for the speaker with the temporary name exceeds a threshold level, associating the chunk with the speaker with the temporary name.

17. The method of claim 10, wherein the signaling the graphical display unit to display the formatted text along with an identity for the speaker of the formatted text further comprises:

filtering out ATC conversations with traffic aircraft based on flight crew member inputted filter criteria; and signaling the graphical display unit to display the formatted text along with an identity for the speaker of the formatted text for ATC conversations that were not filtered out.

18. A non-transitory computer-readable medium having stored thereon instructions which when executed by one or more processors in a flight deck system causes the flight deck system to perform a method for extracting speaker information in an ATC (Air Traffic Controller) conversation and displaying the speaker information on a graphical display unit, the method comprising:

segmenting a stream of audio received over radio from an ATC and other aircraft into a plurality of chunks, wherein each chunk has a speaker;

extracting vocal cord and prosody based features from a chunk;

generating a plurality of similarity scores for the extracted vocal cord and prosody based features for the chunk, wherein each similarity score of the plurality of similarity scores is based on a comparison of the extracted vocal cord and prosody based features for the chunk with a different model file from a plurality of model files in an enrolled speaker database for a plurality of speakers from the enrolled speaker database, wherein the plurality of model files are associated with different speakers from the enrolled speaker database;

when a specific similarity score from the plurality of similarity scores determined based on the comparison of the extracted vocal cord and prosody based features with the plurality of model files in the enrolled speaker database for the plurality of speakers exceeds a threshold level, associate the chunk with a particular speaker from the enrolled speaker database, decoding the chunk using a speaker-dependent automatic speech recognition (ASR) model that is specific for the speaker and tagging the chunk with a permanent name for the speaker;

when a specific similarity score from the plurality of similarity scores determined based on the comparison of the extracted vocal cord and prosody based features with the plurality of model files in the enrolled speaker database for the plurality of speakers does not exceed a threshold level, assigning a temporary name for the speaker of the chunk, tagging the chunk with the temporary name, and decoding the chunk using a speaker independent speech recognition model;

formatting the decoded chunk as text;

signaling the graphical display unit to display the formatted text along with an identity for the speaker of the formatted text, the identity comprising the permanent name of the speaker or the temporary name assigned to the speaker; and enrolling a non-enrolled speaker into the speaker database and creating a speaker-dependent ASR model for the non-enrolled speaker after a predetermined number of chunks of audio from the non-enrolled speaker are received.

19. The non-transitory computer-readable medium of claim 18, wherein the method further comprises signaling the graphical display unit to display, along with the formatted text and the identity for the speaker of the formatted text, extracted information including count and duration of messages for the speaker of the formatted text, number of total speakers during flight journey, and percentage of messages in the flight journey for the speaker of the formatted text.

20. The non-transitory computer-readable medium of claim 18, wherein the method further comprises saving the extracted vocal cord and prosody based features for the chunk as a model file for a speaker with a temporary name when none of the plurality of similarity scores for the extracted vocal cord and prosody based features exceeds the threshold level.

* * * * *